(12) United States Patent
Rabbett

(10) Patent No.: US 12,535,173 B1
(45) Date of Patent: Jan. 27, 2026

(54) WATER CONTAINMENT APPARATUS

(71) Applicant: Brendan J. Rabbett, Cottage Grove, MN (US)

(72) Inventor: Brendan J. Rabbett, Cottage Grove, MN (US)

(*) Notice: Subject to any disclaimer, the term of this patent is extended or adjusted under 35 U.S.C. 154(b) by 487 days.

(21) Appl. No.: 18/135,087

(22) Filed: Apr. 14, 2023

Related U.S. Application Data

(60) Provisional application No. 63/453,094, filed on Mar. 18, 2023.

(51) Int. Cl.
| | | |
|---|---|---|
| *F16L 55/17* | (2006.01) | |
| *F16L 55/16* | (2006.01) | |
| *F16L 55/168* | (2006.01) | |
| *B08B 17/02* | (2006.01) | |
| *F16L 11/00* | (2006.01) | |

(52) U.S. Cl.
CPC ........... *F16L 55/17* (2013.01); *F16L 55/1604* (2013.01); *F16L 55/168* (2013.01); *B08B 17/025* (2013.01); *F16L 11/00* (2013.01); *F16L 55/1715* (2013.01); *Y10T 137/5762* (2015.04)

(58) Field of Classification Search
CPC ...... B08B 17/025; B63B 43/16; F16L 55/005; F16L 55/1604; F16L 55/168; F16L 55/17; F16L 55/179; F16L 59/106; F16L 2201/30; Y10T 137/5762; Y10T 137/5835
USPC .............................................. 141/86; 285/13
See application file for complete search history.

(56) References Cited

U.S. PATENT DOCUMENTS

| | | | | |
|---|---|---|---|---|
| 1,965,227 A | * | 7/1934 | Fiero ..................... | B65D 81/264 206/521 |
| 2,435,743 A | * | 2/1948 | Geimer ................. | B65D 31/02 383/88 |
| 3,135,458 A | * | 6/1964 | Steuart ...................... | E03F 7/00 383/41 |
| 3,850,451 A | * | 11/1974 | Matthiessen .......... | F16L 23/003 116/200 |
| 4,448,218 A | * | 5/1984 | Vetter ..................... | F16L 55/17 285/97 |
| 4,622,027 A | * | 11/1986 | Parish .................... | B65D 90/24 383/41 |
| 4,633,899 A | * | 1/1987 | Lord ....................... | E04D 13/00 52/39 |
| 4,784,184 A | * | 11/1988 | Gates ...................... | E03C 1/086 285/8 |
| 4,812,700 A | * | 3/1989 | Natale ..................... | B08B 9/023 134/21 |

(Continued)

FOREIGN PATENT DOCUMENTS

GB          1479605 A   *   7/1977   .............. F16L 55/17

*Primary Examiner* — Robert K Arundale
*Assistant Examiner* — Richard K. Durden

(57) ABSTRACT

A piece having a proximal end portion, an intermediate portion, and a distal end portion, where the portions are flexible, where the portions are integral with each other, where the intermediate and distal end portions are tubular, where the proximal end portion in a first state is non-tubular, in a second state is foldable away from the intermediate portion, and in a third state is tubular with an axis transverse to an axis of the intermediate portion. The piece may be carried in a case having pipe caps, pipe plugs, pipe cutting tools, a pipe freezing chemical/foam sleeve combination, a pair of pliers, a roll of tape, zip ties, and a hose end sacrificial closure.

20 Claims, 8 Drawing Sheets

(56) References Cited

U.S. PATENT DOCUMENTS

| | | | | | |
|---|---|---|---|---|---|
| 4,912,358 | A | * | 3/1990 | Vitta | B08B 15/026 |
| | | | | | 312/3 |
| 5,027,862 | A | * | 7/1991 | Laybourn | F16L 55/17 |
| | | | | | 29/402.09 |
| 5,099,872 | A | * | 3/1992 | Tarvin | F16N 31/002 |
| | | | | | 296/38 |
| 5,365,968 | A | * | 11/1994 | Mills | F24D 19/088 |
| | | | | | 220/571 |
| 5,725,009 | A | * | 3/1998 | Mallow, Sr. | F16L 55/18 |
| | | | | | 383/113 |
| 6,125,647 | A | * | 10/2000 | Martinez | F24F 13/222 |
| | | | | | 62/304 |
| 6,227,232 | B1 | * | 5/2001 | Williams, Sr. | A62C 35/68 |
| | | | | | 285/8 |
| 6,640,825 | B2 | * | 11/2003 | McAtarian | G01M 3/04 |
| | | | | | 138/104 |
| 7,246,639 | B2 | * | 7/2007 | Kuntz | B64F 1/28 |
| | | | | | 141/311 A |
| 7,938,136 | B1 | * | 5/2011 | Walker | F16L 55/179 |
| | | | | | 285/15 |
| 8,439,060 | B1 | * | 5/2013 | Jackson | A62C 35/68 |
| | | | | | 285/13 |
| 9,022,082 | B1 | * | 5/2015 | Signalness | B67D 7/421 |
| | | | | | 141/379 |
| 9,259,769 | B1 | * | 2/2016 | Kane | F28G 9/00 |
| 10,144,628 | B1 | * | 12/2018 | Hardy | B67C 11/00 |
| 10,982,915 | B2 | * | 4/2021 | Hui | B08B 15/02 |
| 2012/0273014 | A1 | * | 11/2012 | Tadayon | F02C 7/00 |
| | | | | | 134/166 R |
| 2013/0227917 | A1 | * | 9/2013 | Joy | B65D 33/00 |
| | | | | | 53/469 |
| 2023/0313932 | A1 | * | 10/2023 | Butterfield, IV | F16L 55/00 |
| | | | | | 285/15 |

* cited by examiner

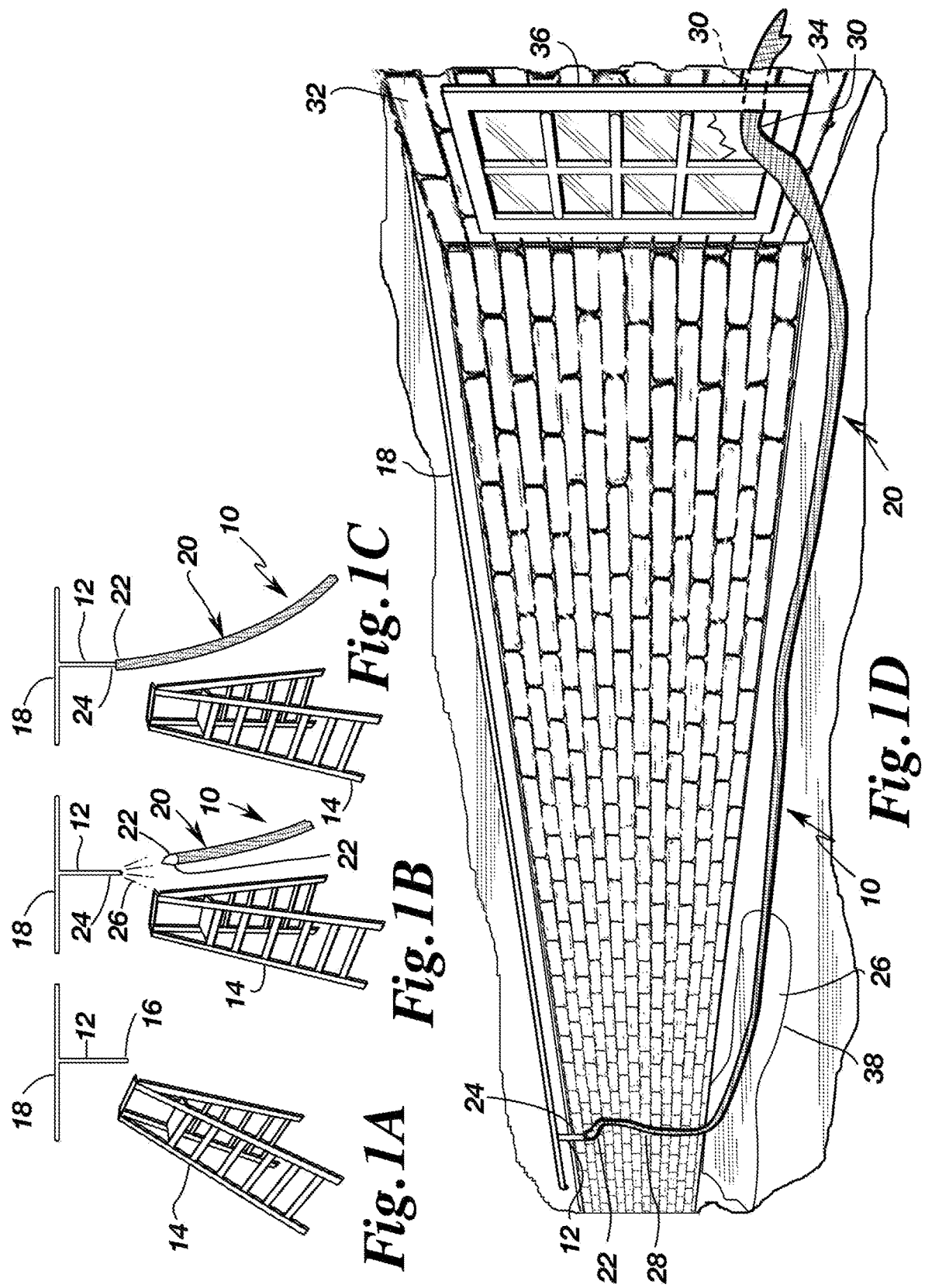

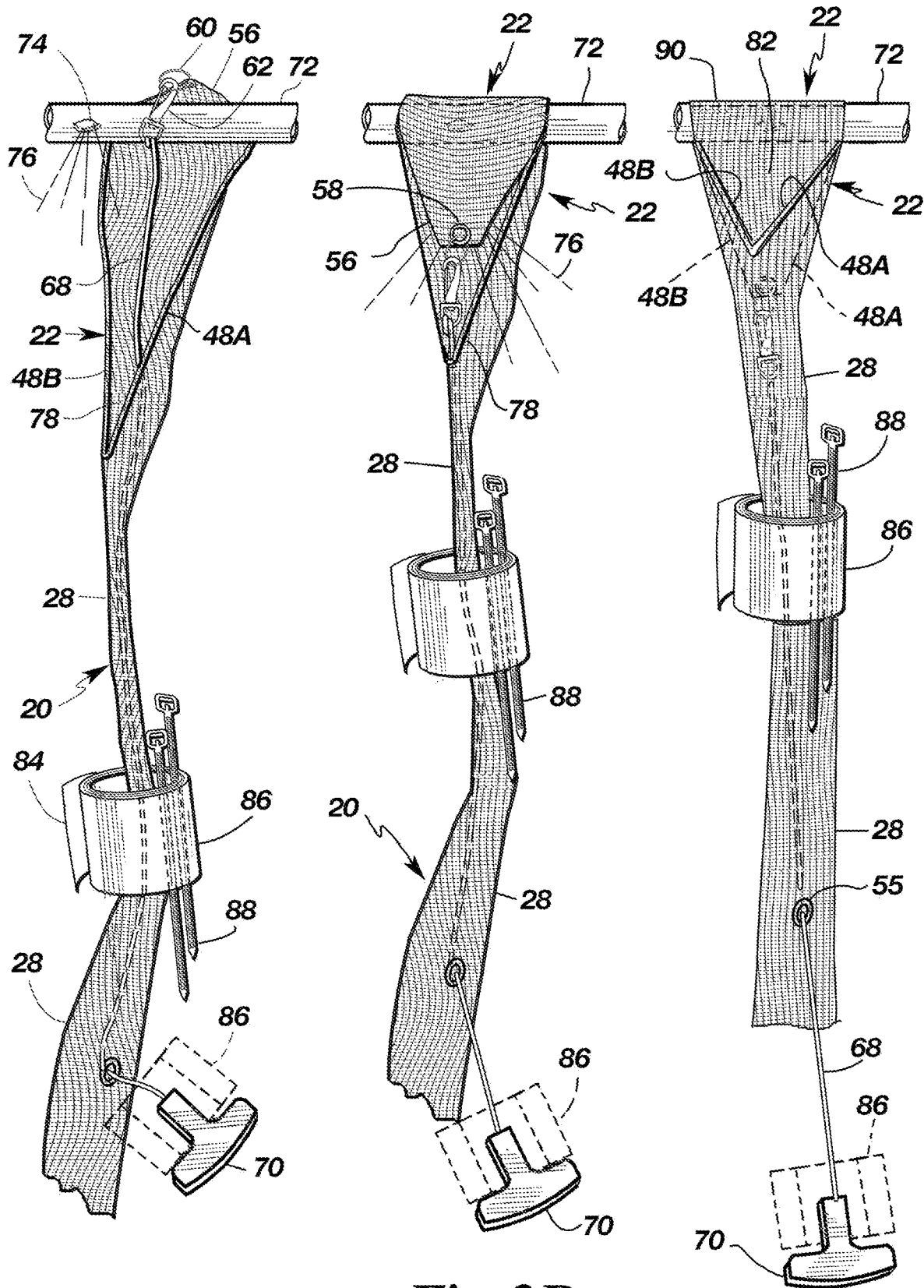

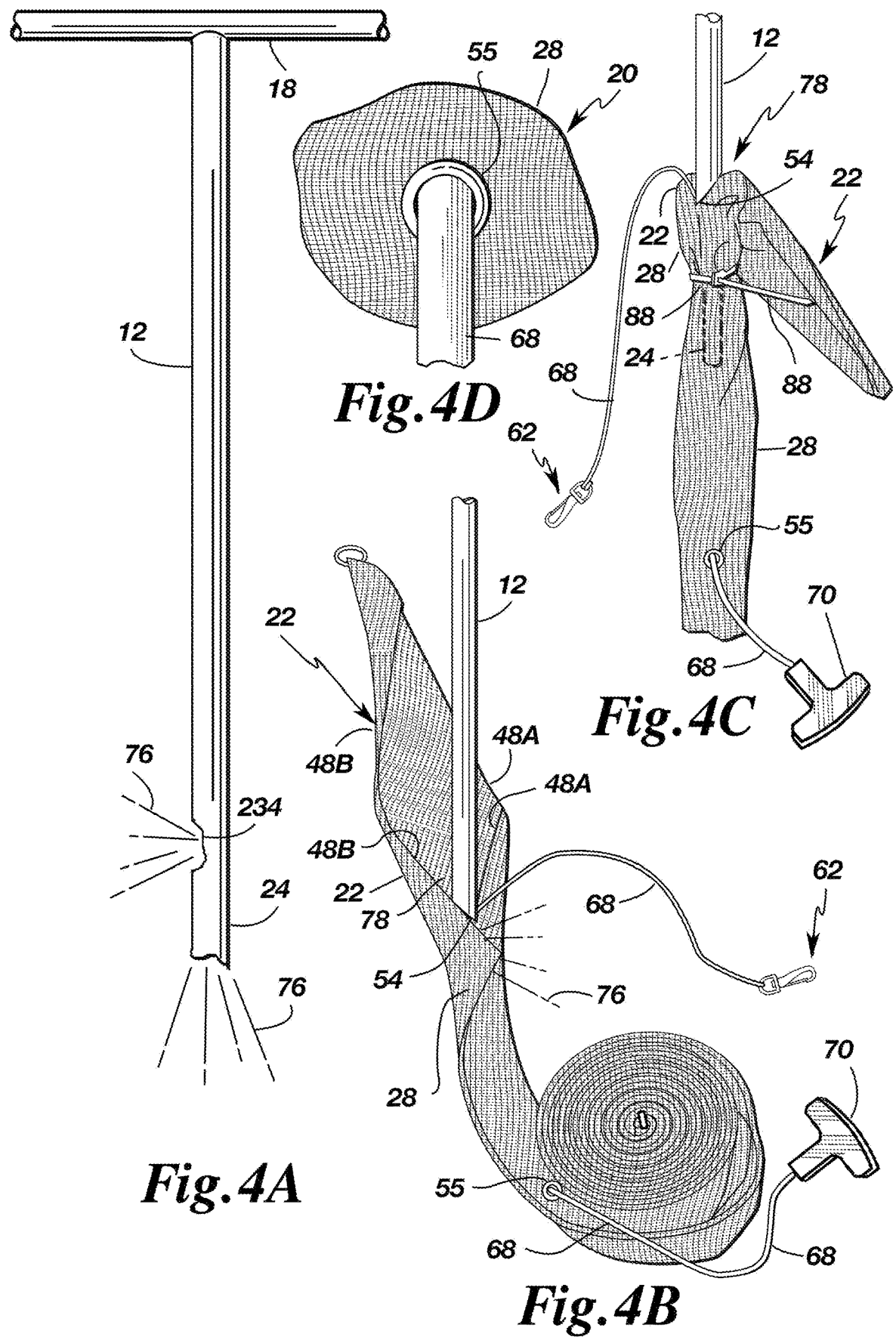

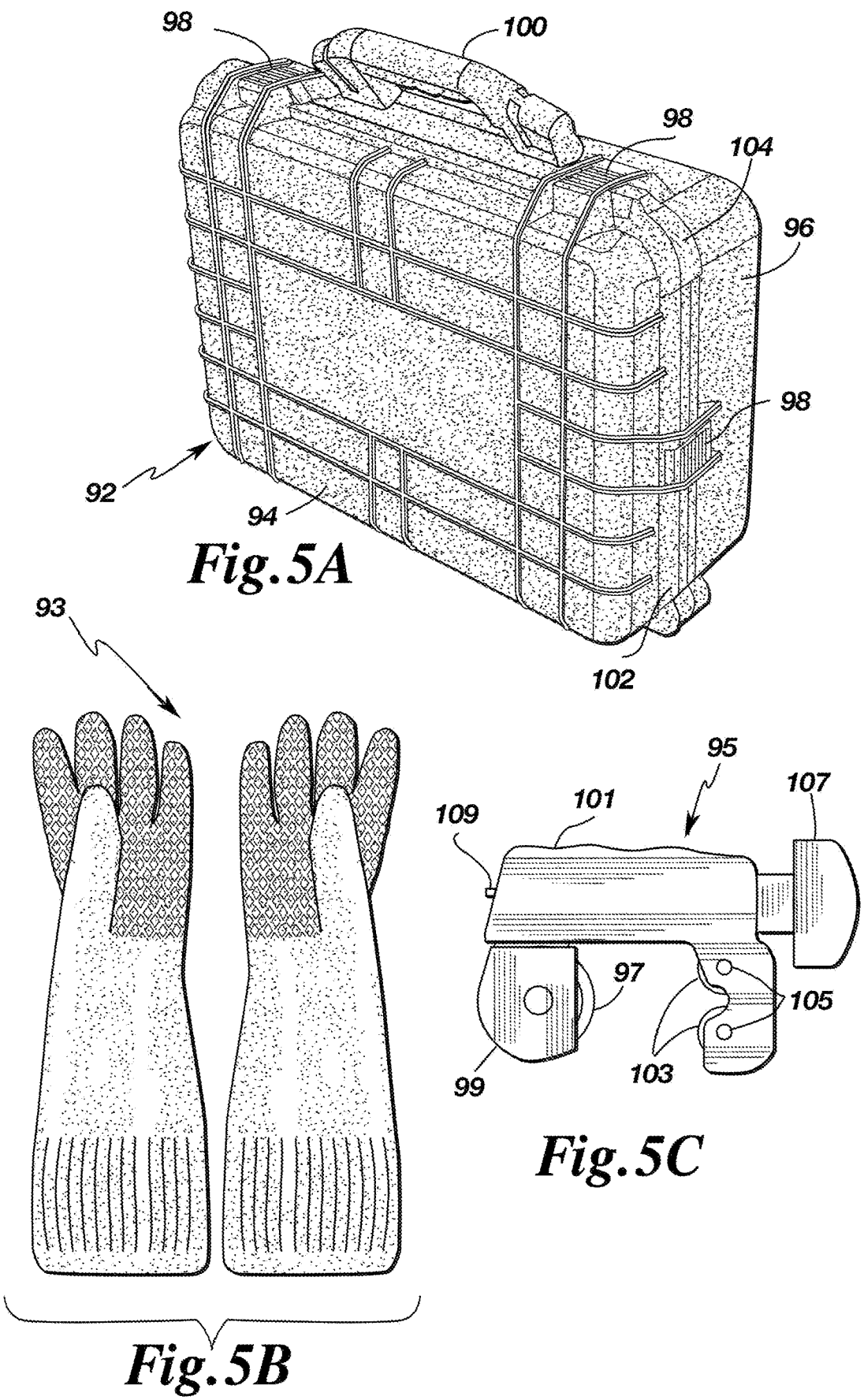

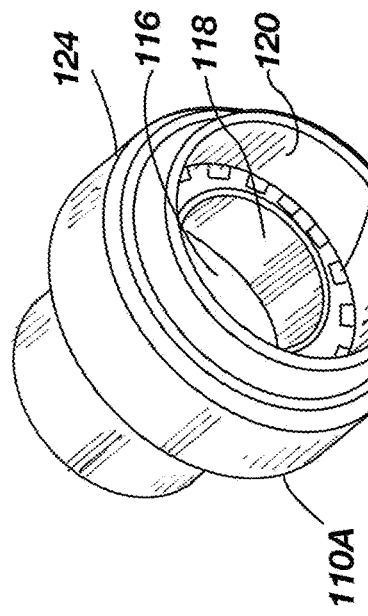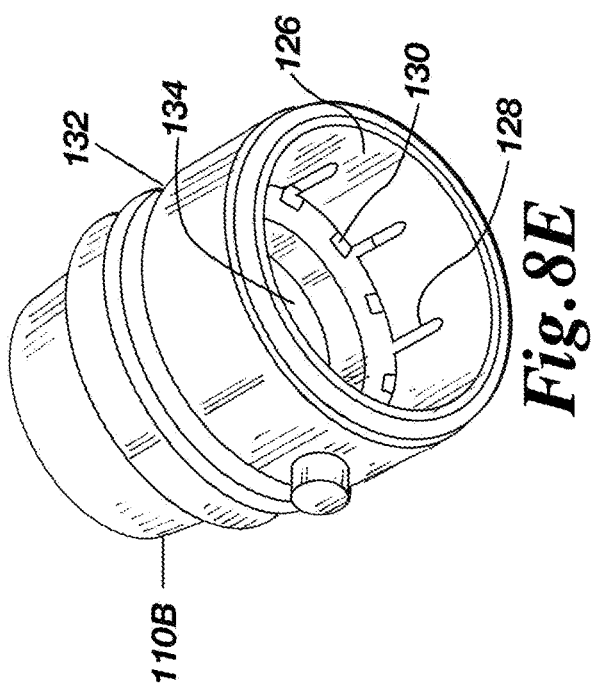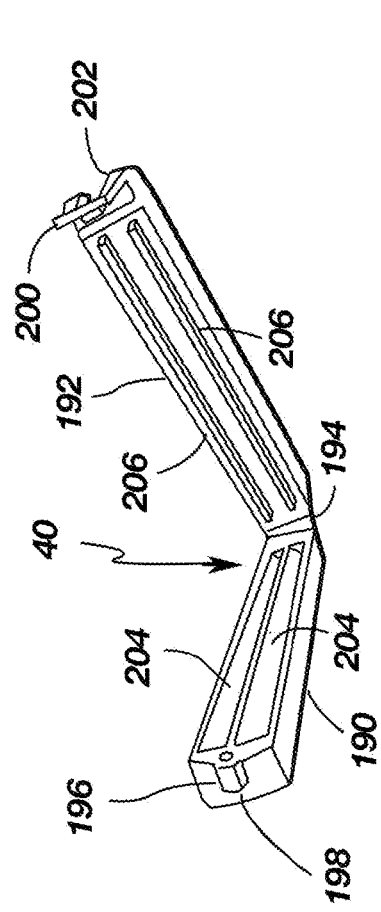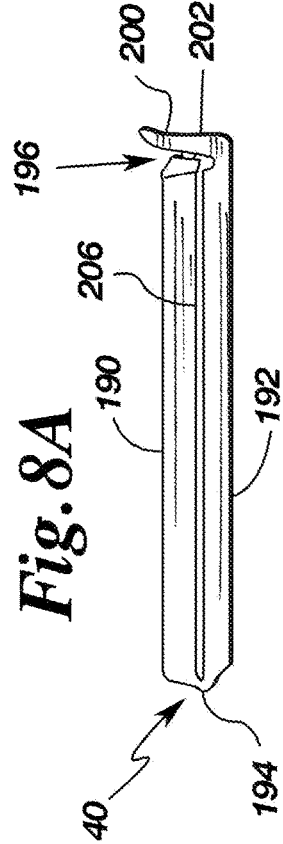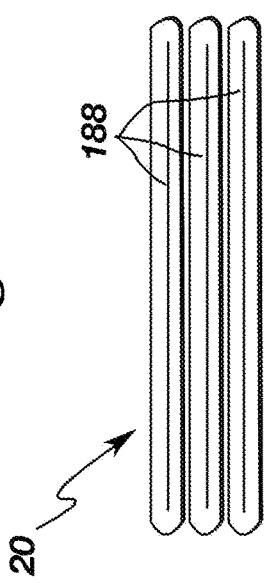

WATER CONTAINMENT APPARATUS

This application claims the benefit under 35 U.S.C. 119 (e) of U.S. Provisional Patent Application Number 63/453,094 filed Mar. 18, 2023 and entitled Water Containment Apparatus, which application is hereby incorporated by reference in its entirety into this application.

FIELD OF THE INVENTION

The present invention relates to a fire hose having a flexible proximal end modified to be non-tubular in a first state such that the modified proximal end in a second state may be folded away from an intermediate portion of the fire hose and such that the modified proximal end in a third state may form a tubular structure with an axis traverse to an axis of the intermediate portion.

BACKGROUND OF THE INVENTION

The construction industry requires changes to be made to a structure. These changes can be catastrophic if existing systems are damaged. Chief among damages is water. A small drip can cause significant damage overnight if left unattended.

During demolition and construction, a water pipe might get nicked or a sprinkler head is hit. Even the most cautious and experienced construction crew can be caught off guard when a water pipe starts spraying and the shut off valve fails or has not been located. In these situations, a crew member may be forced to turn off the water main which can have disastrous consequences for tenants, businesses, etc.

Changing a structure carries an inherent risk of damaging the structure's systems. One of the most significant systems is water. Water is used in many different ways in a building, sanitation, drinking water, sprinkler/fire systems etc. These pipes can break, leak, and or be accidently cut or nicked during construction/demolition. Even if a construction crew is aware of where the shutoffs are located, they may not be able to access them, or a valve can fail and then an already bad situation gets much worse. Occasionally the only option is to wait for the municipality to shut off their connection and the amount of damage caused will be catastrophic during that wait.

SUMMARY OF THE INVENTION

One purpose of the present invention is to provide an immediate solution to a variety of situations involving water leaking. From an ice maker supply line leaking to a sprinkler head spraying the present invention provides a temporary solution that saves untold amounts in damages.

A feature of the present invention is the provision in a water containment apparatus, of a piece having a proximal end portion, a distal end portion, and an intermediate portion between the proximal end portion and the distal end portion, where each of the proximal end portion, intermediate portion, and distal end portion of the piece is flexible.

Another feature of the present invention is the provision in a water containment apparatus, of the intermediate portion of the piece being tubular and including an intermediate portion axis.

Another feature of the present invention is the provision in a water containment apparatus, of the distal end portion of the piece being tubular and including an open end.

Another feature of the present invention is the provision in a water containment apparatus, of the proximal end portion of the piece including a first state where the proximal end portion of the piece is non-tubular and spread apart.

Another feature of the present invention is the provision in a water containment apparatus, of the proximal end portion of the piece including a second state where the proximal end portion of the piece is foldable away from the intermediate portion to permit the intermediate portion to engage a broken pipe portion such that an axis of the broken pipe portion extends generally in a direction of the intermediate portion axis of the intermediate portion of the piece.

Another feature of the present invention is the provision in a water containment apparatus, of the proximal end portion of the piece including a third state where the proximal end portion of the piece is tubular and includes a third state axis that extends generally transverse to the direction of the intermediate portion axis such that the proximal end portion may be wrapped about a pipe having a pipe axis that extends generally traverse to the direction of the intermediate portion axis of the intermediate portion of the piece.

Another feature of the present invention is the provision in a water containment apparatus, of the proximal end portion of the piece being integral with the intermediate portion of the piece, and where the intermediate portion of the piece is integral with the distal end portion of the piece.

Another feature of the present invention is the provision in a water containment apparatus, of a tether having a proximal end and a distal end, where the proximal end portion of the piece includes a far end spaced from the intermediate portion of the piece, where the proximal end of the tether engages the far end, where the tether extends from the far end of the proximal end portion to an inside of the intermediate portion of the piece and then through the intermediate portion of the piece to an outside of the intermediate portion of the piece, and where the distal end of the tether is outside of the intermediate portion of the piece.

Another feature of the present invention is the provision in a water containment apparatus, of the proximal end of the tether including a quick connect.

Another feature of the present invention is the provision in a water containment apparatus, of the distal end of the tether including a handle.

Another feature of the present invention is the provision in a water containment apparatus, of a roll of tape engaged to or on the intermediate portion of the piece.

Another feature of the present invention is the provision in a water containment apparatus, of at least one zip tie removably engaged to the roll of tape.

Another feature of the present invention is the provision in a water containment apparatus, of the proximal end portion of the piece including a far end spaced from the intermediate portion of the piece, where the far end is drawable into the intermediate portion of the piece and, at the same time, the proximal end portion forming a tube having an axis transverse to the intermediate portion axis of the intermediate portion of the piece.

Another feature of the present invention is the provision in a water containment apparatus, of the piece including a rolled up state, where the intermediate portion of the piece has a flat tubular state, where the distal end portion of the piece is disposed in a central portion of the rolled up state, and where the proximal end portion of the piece is disposed on a periphery of the rolled up state.

Another feature of the present invention is the provision in a water containment apparatus, of the distal end portion of the piece including a releaseable clamp or closure that 1)

pinches shut the open end of the distal end portion of the piece until water pressure from inside the piece automatically releases the clamp or the clamp is released manually, or 2) is unclipped by the user after the distal end outlet of the hose has been routed to a safe discharge spot.

Another feature of the present invention is the provision in a water containment apparatus, of the intermediate portion of the piece including an endless inside face, where about one-half of the endless inside face abuts the other half of the endless inside face such that the piece takes a flat tubular form.

Another feature of the present invention is the provision in a water containment apparatus, of a container having an outside and an inside and a handle engaged to the outside of the container for carrying the container, where the piece in the rolled up state is in the inside of the container.

Another feature of the present invention is the provision in a water containment apparatus, of, in the container, a set of push connect caps for quickly engaging a pipe to stop a flow of water, a set of frustoconical stoppers for quickly engaging a pipe to stop a flow of water, and a set of expansion plugs for quickly engaging a pipe to stop a flow of water.

Another feature of the present invention is the provision in a water containment apparatus, of, in the container, a hacksaw having a hacksaw blade and manual pipe cutter.

Another feature of the present invention is the provision in a water containment apparatus, of, in the container, a freeze agent and foam sleeve.

Another feature of the present invention is the provision in a water containment apparatus, of, in the container, a pair of pliers, such as a pair of tongue and groove pliers.

Another feature of the present invention is the provision in a water containment apparatus, of the combination of a) a piece having a proximal end portion, a distal end portion, and an intermediate portion between the proximal end portion and the distal end portion, where each of the proximal end portion, intermediate portion, and distal end portion of the piece are flexible, b) the proximal end portion of the piece being non-tubular, c) the intermediate portion of the piece being tubular, d) the distal end portion of the piece being tubular and including an open end, e) the proximal end portion of the piece being integral with the intermediate portion of the piece, and the intermediate portion of the piece being integral with the distal end portion of the piece, f) the proximal end portion of the piece including a far end spaced from the intermediate portion of the piece, and g) a tether having a proximal end and a distal end, where the proximal end of the tether engages the far end, where the tether extends from the far end of the piece to an inside of the intermediate portion of the piece and then through the intermediate portion of the piece to an outside of the intermediate portion of the piece, and where the distal end of the tether is outside of the intermediate portion of the piece.

Another feature of the present invention is the provision in a water containment apparatus, of the intermediate portion and distal end portion including or being formed from hose.

Another feature of the present invention is the provision in a water containment apparatus, of the intermediate portion and distal end portion including or being formed from a high pressure hose.

Another feature of the present invention is the provision in a water containment apparatus, of the proximal end portion of the piece being formed from hose.

An advantage of the present invention is that floods resulting from various liquid leakage may be temporarily minimized. One feature contributing to this advantage is a flexible proximal end that can be wrapped about a horizontally extending pipe having a leak or a vertically extending pipe have a leak or valves or fixtures that are not necessarily horizontal or vertical. For example, a valve for a sink or toilet may be manipulated with the wrap end or proximal end of the fire hose to contain even a small leak temporarily, which if not contained can cause massive amounts of damage even overnight.

Another advantage of the present invention is that floods resulting from various pipe leakage may be temporarily minimized quickly. One feature contributing to this advantage is the flexible proximal end that can be wrapped quickly about a pipe.

Another advantage of the present invention is that water can be diverted from the point of leakage to a distant relatively safe disposal location. One feature contributing to this advantage is that the flexible proximal end is on one end of a relatively long hose, the distal end of which, for example, can be placed outside of a window or door or, preferably, an opening at floor level because water runs downhill and would more easily run out of the distal end of the hose.

Another advantage of the present invention is that water can be diverted from the point of leakage to a distant relatively safe disposal location quickly. One feature contributing to this advantage is that the relatively long hose, having the proximal end, can be unraveled quickly from the point of leakage to the relatively safe disposal location.

Another advantage of the present invention is that a technician or the ordinary layman has at his or her ready disposal a number of tools for temporarily minimizing pipe leakage caused by a number of pipe issues.

Another advantage of the present invention is that a common fire hose can be easily and inexpensively modified to make the proximal flexible end that engages both horizontally extending and vertically extending pipes or is easily folded away from the intermediate portion of the hose to permit almost any structure having liquid leakage to be easily inserted into the intermediate portion of the fire hose even when such structure is not horizontal or vertical.

Another advantage of the present invention is that it provides a temporary but immediate solution to contain water leaks and minimize damage. The possibility of damaging a pipe or valve failing is quite prevalent while doing even basic repairs. In buildings with sprinkler systems there is even more potential for catastrophic damage. Even when construction crews do their due diligence and locate valves and shutoffs, such valves and shutoffs do not always work or are not immediately accessible.

Another advantage is that the present invention allows for temporary containment of water in a multitude of situations that frequently arise in construction.

BRIEF DESCRIPTION OF THE DRAWINGS

FIG. 1A is a general diagrammatic view of a ladder about to hit and break an end of a piping system such as a fire sprinkler system.

FIG. 1B is a general diagrammatic view of the piping system of FIG. 1A having been broken, in the process of spilling water, and about to be engaged by a proximal end of a hose of a water containment apparatus of the present invention.

FIG. 1C is a general diagrammatic view of the piping system of FIG. 1B having been engaged by the proximal end of the hose of the water containment apparatus of the present invention.

FIG. 1D is a general diagrammatic view of the piping system of FIG. 1B having been engaged by the proximal end of the hose of the water containment apparatus of the present invention, with the distal end of the hose of the water containment apparatus having been placed out of the building to minimize damage to the building.

FIG. 3A is a perspective view of the proximal end of the hose of the water containment apparatus of FIG. 2D about to engage a horizontally extending broken pipe that is spilling water.

FIG. 3B is a perspective view of the proximal end of the hose of the water containment apparatus of FIG. 2D further engaging the horizontally extending broken pipe of FIG. 3A.

FIG. 3C is a perspective view of the proximal end of the hose of the water containment apparatus of FIG. 2D having fully engaged the horizontally extending broken pipe of FIG. 3A.

FIG. 4A is a perspective detail view of the broken pipe of FIG. 1B.

FIG. 4B is a perspective detail view of the proximal end of the hose of the water containment apparatus of FIG. 2D in the process of engaging the broken pipe of FIG. 4A.

FIG. 4C is a perspective detail view of the proximal end of the hose of the water containment apparatus of FIG. 2D having fully engaged the broken pipe of FIG. 4A, where the proximal end itself forms a tube having a vertical axis and/or where the proximal end is folded away from the intermediate portion of the hose to permit the broken end of the pipe to be easily inserted into the intermediate portion.

FIG. 4D is a detail view of a grommet engaging the wire of a pull cord of the proximal end of the hose of the water containment apparatus of FIG. 2D, where the inside diameter of the grommet is about equal to the outside diameter of the wire of the pull cord to minimize leakage of water therebetween.

FIG. 5A is a perspective outer view of a case that contains at least the hose of the water containment apparatus of FIG. 2D.

FIG. 5B is a top view of a pair of rubber gloves that is housed in the case of FIG. 5A.

FIG. 5C is a side view of a first relatively small pipe cutter.

FIG. 8A is a perspective view of the sacrificial clamp shown in FIG. 2A, where the clamp is in an open state prior to engagement to the open distal end of the hose of FIG. 2A.

FIG. 8B is a side view of the sacrificial clamp of FIG. 8A, where the clamp of FIG. 8B is shown in a closed state.

FIG. 8C shows a diagrammatic view of a section of hose of FIG. 7, where the hose is in a stored state without water being conveyed therethrough.

FIG. 8D shows a first kind of push connect cap of FIG. 6.

FIG. 8E shows a second kind of push connect cap of FIG. 6.

DESCRIPTION

Figures 2A, 2B, 2C, 2D:
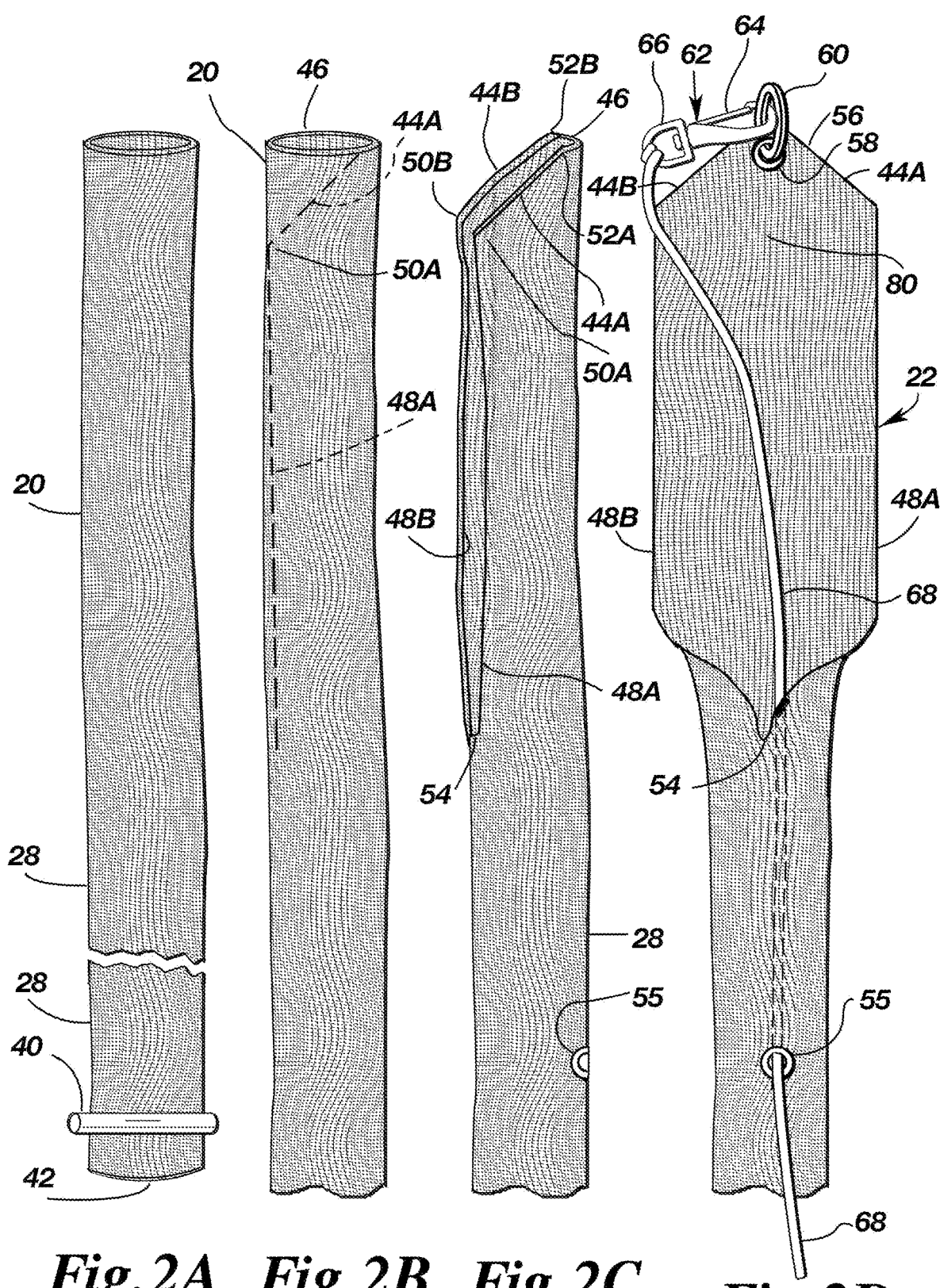
FIG. 2A is a perspective view of the proximal end of a hose, prior to the proximal end of the hose being modified into the proximal of the hose of the water containment apparatus of FIG. 2D, with FIG. 2A further showing a portion of the intermediate portion of the hose of the water containment apparatus and a portion of the distal end portion of the hose of the water containment apparatus.
FIG. 2B is a perspective view of the proximal end of the hose of FIG. 2A and shows in phantom where cuts may be made as a step in a process to make the proximal end of the hose of the water containment apparatus of FIG. 2D.
FIG. 2C is a perspective view of the proximal end of the hose of FIG. 2B, with cuts having been made as a step in the process to make the proximal end of the hose of the water containment apparatus of FIG. 2D.
FIG. 2D is a perspective view of the proximal end of the hose of the water containment apparatus, with the use of such proximal end being shown in FIGS. 1B, 1C, 1D, 3A, 3B, 3C, 4B, and 4C.

FIG. 1A shows a vertical pipe portion 12 about to be hit by the top of a ladder 14. The ladder 14 is about to hit a bottom end 16 of the vertical pipe portion 12. A horizontal pipe portion 18 feeds the vertical pipe portion 16. A sprinkler head may be on the bottom end 16 of the vertical pipe portion 12.

FIG. 1B shows a water containment apparatus 10 or flood minimizing apparatus 10 having a flexible hose 20 with a proximal flexible end or end portion 22 about to engage a broken bottom portion 24 that is spilling water 26.

FIG. 1C shows the proximal flexible end or end portion 22 of the hose 20 having engaged the broken bottom portion 24.

FIG. 1D shows the entirety of the hose 20, including the proximal end portion 22, an intermediate portion 28, and a distal end portion 30. The proximal end portion 22 is engaged to the broken bottom portion 24 and conveys water to the intermediate end portion 28 that then conveys the water to the distal end portion 30. Distal end portion 30 dispenses the water to an exterior of the structure 32.

Structure 32 is a warehouse having a brick wall 34 and a window 36 in the brick wall 34. The window 36 leads from an interior of the structure 32 to an exterior of the structure 32. The broken bottom portion 24 may be a relatively great distance from a bathroom with a sink or toilet and is a relatively great distance from the window 36 which is the point of dispensing in FIG. 1D. Breaking the window 36 or breaking another structure such as a door and using the present flood minimizing apparatus 10 or water containment apparatus 10 is preferable to calling a plumber and letting a pool 38 of water 26 seek lower levels in the interior of the structure 32 thereby causing damage to floors or to stored materials or to almost anything.

FIG. 2A shows a flexible hose 20 having the proximal end portion 22 prior to modification. Proximal end portion 22 is tubular or cylindrical with no cuts therein.

FIG. 2A further shows the distal end portion 30. Distal end portion 30 is engaged by a sacrificial closure 40 that closes the open end 42 of the distal end portion 30 until water pressure builds in the intermediate portion 28 of the hose 20. Closure 40 extends across the width of the distal end portion 30 and squeezes opposing faces of the distal end portion 30 together.

FIG. 2B shows a first step in modifying hose 20. The first step is to make a first oblique cut 44A from a top end or top edge 46 of the hose 20 and then continue the cut downwardly to form a straight cut 48A running parallel to an axis of the intermediate portion 28. Cuts 44A and 48A form an obtuse angle at a cut junction 50A. An obtuse angle is an angle that is greater than 90 degrees and less than 180 degrees.

FIG. 2C shows that the second step in modifying hose 20 is to repeat the first step at a different location. Where the first step has a starting location 52A, the second cut has a starting location 52B that is adjacent to the starting location 52A. The second step includes an oblique cut 44B and a straight cut 48B.

FIG. 2C shows that the straight cuts 48A and 48B are joined by a small bottom horizontal cut 54. Bottom cut 54 runs parallel to top edge 46.

FIG. 2C shows that, when horizontal cut 54 is formed, a hose piece is removed and such removed hose piece is defined by cuts 44A, 44B, 48A, 48B, and 54. Removal of such hose piece leaves behind a small section of top edge 46 that extends to and between locations 52A and 52B. FIG. 2C also shows that a grommet 55 may be engaged in the intermediate portion 28 to provide an opening between the interior of the hose 20 and the exterior of the hose 20.

FIG. 2D shows that, when such hose piece is removed, a proximal end portion 22 is formed and defined by cuts 44A, 44B, 48A, 48B, and 54. Proximal end portion 22 includes a far end 56 into which a grommet 58 is engaged. In turn, engaged to the grommet 58 is a split key ring 60. In turn, engaged to the split key ring 60 is a quick connect 62, namely, a snap clamp 62. Snap clamp 62 has a quick connect portion 64 on one end and a swivel D-ring 66 on the other end. The quick connect portion 64 includes a hook closed by a resilient flat spring to make the hook effectively a loop. In turn, engaged to the D-ring 66 is a tether 68. Tether 68 extends from the D-ring 66 to the interior of the intermediate hose portion 28 to the grommet 55, where the tether 68 exits to the exterior of the intermediate hose portion 28. Tether 68 includes, engaged on its distal end, a T-shaped handle 70. Tether 68 may be flexible. Tether 68 may be relatively rigid such that a pushing action on the handle 70 in turn pushes up on the quick connect 62, such as in the orientation shown in FIGS. 3A, 3B, and 3C.

If desired, first and second snap clamps 62 may be used, where the swivel D-ring 66 of a first snap clamp 62 is engaged to the split key ring 60, where the quick connect portion 64 of the first snap clamp 62 is engaged to the quick connect portion 64 of a second snap clamp 62, and where the swivel D-ring 66 of the second snap clamp 62 is engaged to the tether 68.

FIGS. 3A, 3B, and 3C show the proximal end portion 22 of the hose 20 engaging horizontal piping 72.

Figure 7:
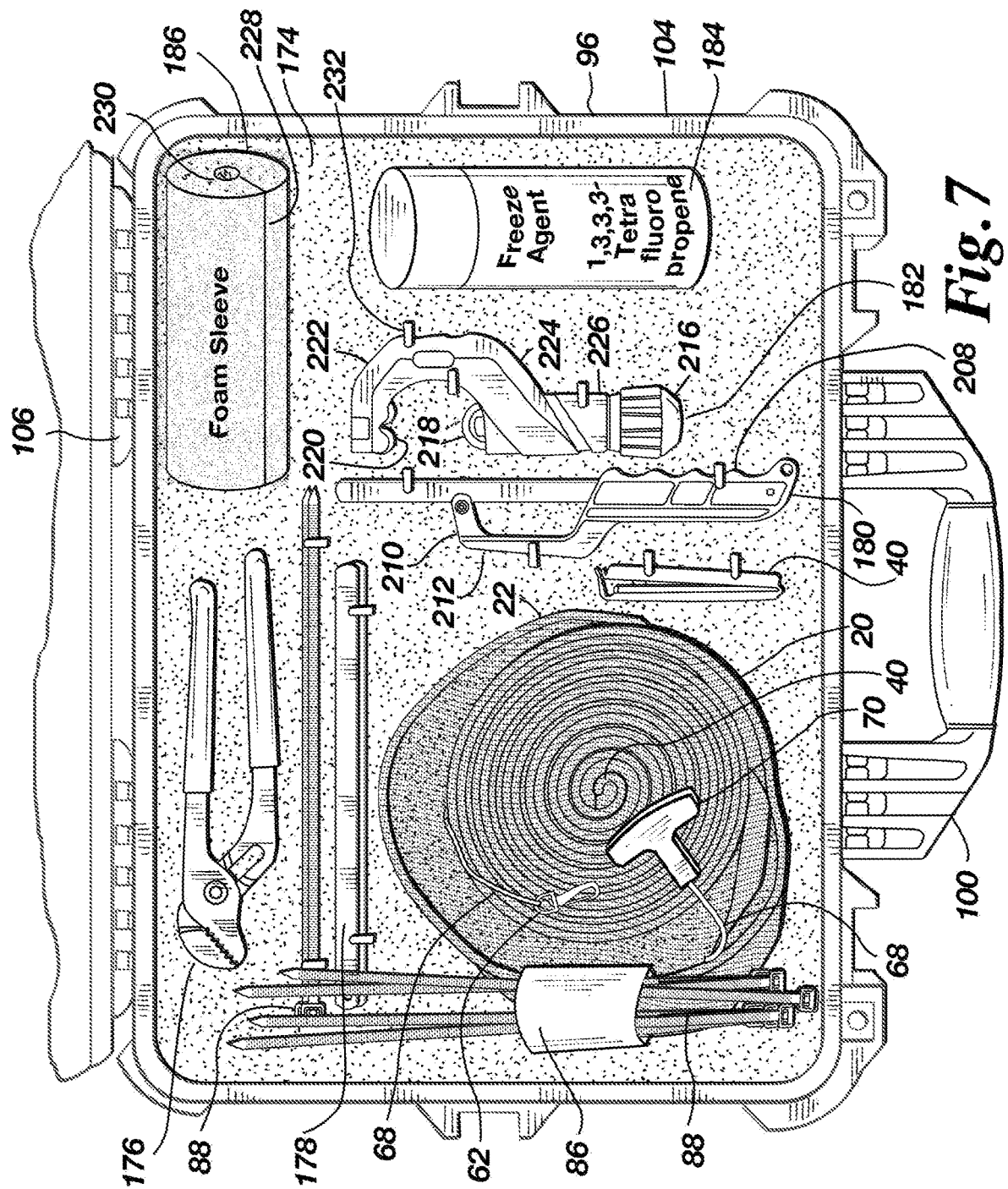
FIG. 7 is a top view of a second one-half portion of the inside of the case of FIG. 5A, where the second one-half portion contains the entire hose of FIG. 1D that includes the proximal end of FIG. 2D, a sacrificial clip that temporarily holds the open distal end of the hose of FIG. 1D closed, a hack saw having a hacksaw blade engaged thereto, a second relatively large pipe cutter, a canned freeze agent, a foam sleeve for being placed over a broken pipe and sprayed with the freeze agent, a pair of pliers, a set of zip ties, and a set of extra hacksaw blades, all of which are engaged in foam or molded plastic to minimize movement during transport, storage, and use.

FIG. 3A shows the quick connect 62 engaged to the ring 60. However, it should be noted that FIG. 7 shows the quick connect 62 disengaged from the ring 60. Such disengagement is intended and saves time when it comes to engaging the proximal end portion 22 to a broken pipe. Here, with the quick connect 62 and ring 60 disengaged from each other, the proximal end 22 is placed along the back side of piping 72 because the user, i.e., the technician or layman, is working face to face to the piping 72. Then the proximal end 22 is pulled up over the back side of the piping 72 and perhaps partially over the top side of piping 72, whereupon the quick connect 62 is attached to the ring 60. This activity may take place over the pipe break 74 having water 76 spilling out or this activity may take place at a slightly offset location such as shown in FIG. 3A.

Then, as shown in FIG. 3B, the proximal end portion 22 may be slid sideways to a position over the water break 74 and, at more or less the same time, the handle 70 is pulled downwardly to pull the far end 56 of the proximal end portion 22 downwardly toward a throat 78 that leads to the inside of the intermediate portion 28. At this point in time, as shown in FIG. 3B, water 76 may be spilling out of openings between the proximal end portion 22 and the intermediate portion 28.

Then, as shown in FIG. 3C, the handle 70 is pulled further downwardly to pull the far end 56 into the throat 78 and into the inside of the intermediate portion 28. At this point of engagement, almost all if not all of the water 76 spilling from the break 74 is funneled to the inside of the intermediate portion 28 and further conveyed, as shown in FIG. 1D, to the distal end portion 30 of the hose 20, whereupon, after a certain amount of water pressure builds, the closure 40 may automatically disengage from the hose 20 or the closure 40 may be unclipped by the user such that the water 76 is released to a safe location, such as to the exterior of structure 32.

In the state of engagement shown in FIG. 3C, there are several forces at work that hold the proximal end portion 22 engaged in the intermediate portion 28. One force is the spilling water 76 itself, which may spray against top inside face 80 and push the perimeter or border portions of the top outer face 82 against inside portions of the throat 86 and intermediate portion 28 to thereby effectively seal the proximal end portion 22 with the intermediate portion 28. Another force is gravity, which pulls down on the handle 70 to keep the far end 56 in the inside of the intermediate portion 28. If such forces are insufficient to hold the proximal end 22 engaged with the intermediate portion 28, tape 84 from a tape roll 86 may be wrapped about the proximal end portion 22 and intermediate portion 28 when the far end 56 is engaged in the inside of the intermediate portion 28. Still further, zip ties 88 may be engaged about the proximal end portion 22 and intermediate portion 28 when the far end 56 is engaged in the inside of the intermediate portion 28. As shown in FIG. 3C, lower portions of cuts 48A and 48B form a V-shape, and the tape 84 and/or zip ties 88 may close this V-shape to minimize the chances that the far end 56 disengages from the inside of the intermediate portion 28. Amongst such activities, if desired, the tape roll 86 may be cut into two pieces and removed from the intermediate portion 28.

Tape 84 includes a polymer layer, a scrim layer, an adhesive layer, and a release layer. The polymer layer is a polymer backing to make the tape 84 waterproof. The preferred polymer is polyethylene. The polymer backing is on a high tensile woven scrim having interwoven threads. The scrim is sandwiched between the polymer backing and an adhesive melted and bonded with the scrim using heat and pressure. Tape 84 further includes a release or paper release layer on the face of the adhesive opposite of the scrim layer. In rolled form, the release layer is disposed between the outer face of the polymer layer and the inner face of the adhesive layer. Tape 84 (and its four layers identified above) wound on a cardboard cylinder make up the tape roll 86.

As the user, i.e., the technician or layman, is going through the steps shown in FIGS. 3A, 3B, and 3C, the tape roll 86 may be engaged by the T-shaped handle 70 by laying disposed at rest on the outwardly projections of the T-shaped handle 70. Zip ties 88 are engaged by sacrificial or releaseable tape on the inside of the cylindrical base of the tape roll 86. The "lay at rest" location of the tape roll 86 is shown in phantom in FIGS. 3A, 3B, and 3C.

By comparing FIG. 3A with FIG. 3B with FIG. 3C, one can see that the intermediate portion 28 is rather narrow where it passes through the tape roll 86 in FIGS. 3A and 3B because relatively little water 76 passing through such portion at such time. However, in FIG. 3C, with the proximal end portion 22 being engaged over the water break 74 and further being engaged in throat 78 and in the inside of the intermediate portion 28, the intermediate portion 28 has expanded due to a relatively large amount of water 76 passing therethrough.

In FIG. 3A, there is no overlap of a section of proximal end portion 22 with another section of the proximal end portion 22. In FIG. 3B, there is no overlap of a section of proximal end portion 22 with another section of the proximal end portion 22, but a portion of cut 48A is approaching another portion of cut 48A and a portion of cut 48B is approaching another portion of cut 48B. Then, in FIG. 3C, a distal portion of cut 48A is tucked inside of a proximal portion of cut 48A such that a first section of proximal end portion 22 overlaps with a second section of proximal end portion 22, and a distal portion of cut 48B is tucked inside of a proximal portion of cut 48B such that a third section of proximal end portion 22 overlaps with a fourth section of proximal end portion 22.

In FIGS. 3A, 3B, and 3C, it can be appreciated that proximal end portion 22 forms a tube portion 90 about the piping 72. Such tube portion 90 is cylindrical in an upper half, defined as being above a horizontal plane that includes the horizontal axis of piping 72, and then tapers in the lower half where one inner face portion 80 confronts another inner face portion 80 to form a proximal end conveyance structure that conveys the spilled water 76 to the throat 78 and inside of the intermediate portion 28.

FIG. 4A shows horizontal pipe portion 18, vertical pipe portion 12, and a broken end 24 spilling out water 76.

FIG. 4B shows that the proximal end portion 22 and intermediate portion 28 have been pushed up to engage the broken end 24 and a section of the vertical pipe portion 12 such that the broken end 24 and vertical pipe portion 12 have been received by the throat 12, by a section of the proximal end portion 22, and by a section of the intermediate portion 28. The quick connect 62 is not used with this repair, although if a zip tie 88 or tape roll 86 is not available the tether 68 can be wrapped about the outside of the hose 20 below the small cut 54 or below and adjacent to the small cut 54 or below and adjacent to the small cut 54 and above the grommet 55, with the tether 68 pinching the hose 20, such as the intermediate portion 28, between the tether 68 and the vertical pipe section 12.

FIG. 4C shows a zip tie 88 engaging the intermediate portion 28 of the hose 20 at a location below and adjacent to the small cut 54 such that the zip tie 88 pinches the intermediate portion 28 of the hose 20 between the zip tie 88 and the vertical pipe section 12 so as to minimize or eliminate water 76 from the broken end 76 backflowing upwardly along the outside of the vertical pipe section 12 and so as to maximize the flow of water to the intermediate portion 28 and then to the distal end portion 30 and then to the exterior of the structure 32.

FIG. 4C shows that the quick connect 62 is suspended in an offset manner and that tether 68 extends from the quick connect 62. Tether 68 then extends into the throat 78 of the proximal end portion 22, further extends into the inside of the intermediate section, and still further extends out of the grommet 55 to an exterior of the intermediate section 28. In doing so, the tether 68 is also pinched by the zip tie 88 bringing pressure to bear upon the outside of the hose 20, which then makes contact with the tether 68, which is held in such pinching manner against the surface of the vertical pipe section 12.

FIG. 4C further shows that the broken end 24 is in the intermediate portion 28 of the hose 20 and below the seal of the zip tie 88. Broken end 24 may be adjacent to the seal of the zip tie 88. Broken end 24 may be between the seal of the zip tie 88 and the grommet 55 where the tether 68 exits. Broken end 24 may be disposed below and adjacent to the grommet 55 where the tether 68 exits.

FIG. 4C shows that a portion of the hose 20 immediately about the seal of the zip tie 88 is tubular and that this tubular section may include a portion of proximal end portion 22 and a portion of intermediate portion 28. Such tubular section is co-axial with the axis of the vertical pipe section 12.

FIG. 4C shows that much of the proximal end portion 22 has been folded away, or has fallen away on its own accord under gravity, such that the broken pipe end 24 has easy access to the opening of the intermediate portion 28.

FIG. 4D shows that the grommet 55 includes an inside diameter that is equal to or slightly greater than the outside diameter of the tether 68. Such serves at least two purposes. First, a seal between the tether 68 and grommet 55 is maximized so as to minimize water leaking out therebetween. Second, the tether 68 is permitted to slide both ways: when pulling on the tether 68 to draw the quick connect 62 downwardly and when pushing on the tether 68 to push the quick connect 62 upwardly. To provide for such pushing action, the tether 68 may have a wire component therein.

FIG. 5A shows the exterior of a case 92. Case 92 includes a receptacle shaped first half 94 and a receptacle shaped second half 96 that are engaged to each other by quick connects 98. A handle 100 is engaged to the receptacle shaped second half 96. Each of the first and second halves 94, 96 includes four sidewalls and a floor such that each of the halves 94, 96 if placed upright could contain water. Thus, each of the halves 94, 96 may also be referred to as a receptacle.

The quick connects or clips or fasteners or connectors 98 may be quickly disconnected such that the halves 94, 96 may be quickly disengaged from each other such that the case 92 may be quickly opened such that a technician or layman may quickly address a broken water pipe. The quick connects 98 may be quickly closed so as to quickly engage the halves 94, 96 to each other so as to quickly close the case 92.

Figure 6:
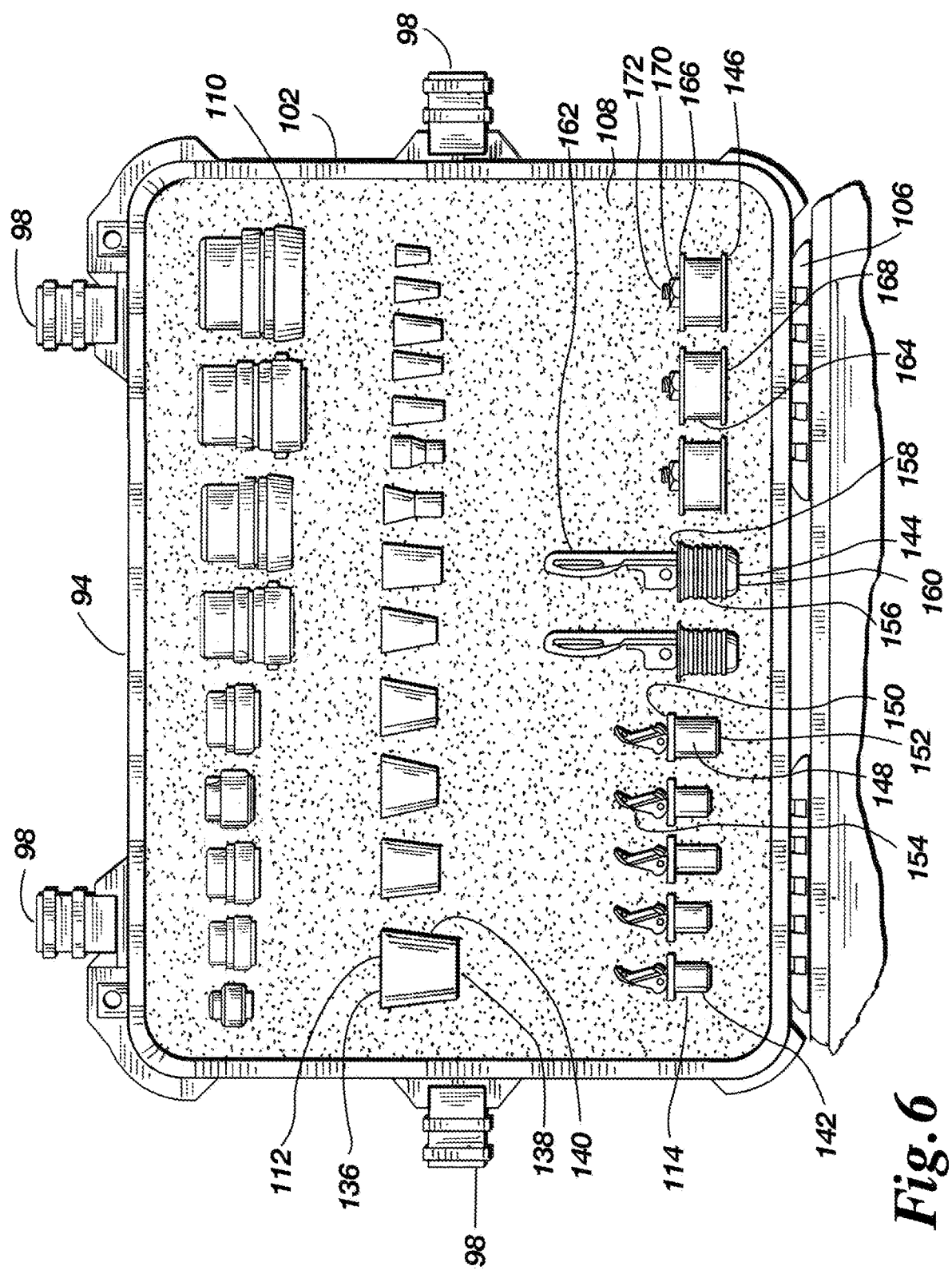
FIG. 6 is a front view of a first one-half portion of the inside of the case of FIG. 5A, where the first one-half portion contains push connect caps of various sizes, rubber stoppers of various sizes, and locking plugs, all of which are engaged in foam to minimize movement during transport, storage, and use.

Each of the receptacles or halves 94, 96 is rigid so as to protect the contents of the case 92. Half 94 includes a periphery 102 and half 96 includes a periphery 104. The peripheries 102, 104 engage each other for 360 degrees, i.e., about their entire peripheries 102, 104, such that a seal between the halves 94, 96 is endless. These peripheries 102, 104 are also shown in FIGS. 6 and 7. FIGS. 6 and 7 further show that the first and second hinges 106 engage the halves 94, 96 such that the halves 94, 96 remain engaged when the case 92 is opened and the halves 94, 96 are swung apart.

FIG. 5B shows a pair of rubber gloves 93 that may be housed in the case 92. One glove is for the right hand. The other glove is for the left hand. Each of the gloves includes a receptacle for each of the fingers. Each of the gloves includes a receptacle for the thumb. The palms of the gloves and the undersides of the finger receptacles of the gloves includes texturing or a roughening to minimize slipping when gripping. The nail portion of the thumb portion of the glove includes texturing. Each of the gloves includes an open arm portion where the user inserts his or her hand and such open arm portion is elastic so as to resiliently open when the hand goes in and resiliently close upon the forearm when the hand is completely in the glove. Each of the gloves is formed of a natural rubber. Each of the gloves is powder-free. Each of the gloves is waterproof.

FIG. 5C shows a relatively small first pipe cutter 95 that may be housed in the case 92. Pipe cutter 95 includes a freely rotating circular cutting blade 97 rotatably mounted in a piece 99 that is engaged to a body 101. The blade 97 is drawn to and from a pair of freely rotating wheels 103 rotatably mounted on respective pins 105. Rotating hand wheel 107 turns a threaded shaft 109 that engages a threaded shaft opening formed a portion of piece 99 that extends into the body 101. Turning the hand wheel 107 pinches a pipe or other object between the cutting blade 97 and wheels 103, whereupon the pipe cutter 95 as a whole is spun about the pipe to cut a groove in the pipe, whereupon the hand wheel 107 is further turned to press the cutting blade 97 further into the pipe at the groove, whereupon the pipe cutter 95 as a whole is again spun about the pipe to increase the depth of the groove. Such steps are repeated until the deepening groove defining the pipe portion to be cut off is fully cut through such that the pipe portion falls off.

Receptacle 94 is shown in FIG. 6. Receptacle 94 includes a piece of foam 108 that is engaged, such as by gluing, to the inside faces of the four sidewalls and floor that make the receptacle shape of the receptacle 94. Foam piece 108 includes 32 cavities formed therein. Each of the cavities includes an open top and a closed bottom such that there is foam between the closed cavity bottom and the floor of the receptacle 94. Nine cavities engage, respectively, nine push connect caps 110 found in a top row. Thirteen cavities engage, respectively, 13 rubber stoppers 112 found in a middle row. Ten cavities engage, respectively, ten expansion plugs 114 found in a bottom row. The cavities engage about one-half the depth of each of the push connect caps 110, rubber stoppers 112, and expansion plugs 114. If desired, each of the cavities may engage between 51% and 75% of the depth of each of the push connect caps 110, rubber stoppers 112, and expansion plugs 114 to maximize the engagement of the push connect caps 110, rubber stoppers 112, and expansion plugs 114 in the foam of the foam piece 108 and, at the same time, permit the user to visually recognize the cap 110, stopper 112, or plug 114 that the user desires.

Foam piece 108 may be a piece of molded plastic that conforms to the outside perimeters of each of the tools in the case 92, where such tools include each of the tools in case receptacle 94 and each of the tools in case receptacle 96, where the tools in case include the push connect caps 110, the rubber stoppers 112, and the expansion plugs 114, and where the tools in receptacle 96 include the tongue in groove pliers 176, the zip ties 88, the rolled up hose 20, the release clamp 40, the hacksaw 208, the hacksaw blades 178, the pipe cutters 182 and 95, the pair of rubber gloves 93 housed in a rectangular plastic package, the can 184 of freeze agent, and the foam sleeve 186. Such conformation may be a tool receptacle for each individual tool such that the tool is frictionally fit in its own unique tool receptacle.

Each of the push connect caps 110 engages a pipe of a different diameter. Each of the rubber stoppers 112 engages a pipe of a different diameter. Each of the expansion plugs 114 engages a pipe of a different diameter. For example, the caps 110, stoppers 112, and plugs 114 may fit pipes having diameters of about or exactly one-quarter of an inch, about or exactly three-eighths of an inch, about or exactly one-half inch, about or exactly five-eighths of an inch, about or exactly three-quarters of an inch, one inch, about or exactly one and one-quarter inches, about or exactly one and one-half inches, about or exactly one and three-quarters of an inch, and about or exactly two inches.

A push connect cap 110 is a tool that seals an open end of a pipe by a push motion. Cap 110 may engage the outside of the pipe at the open end. Cap 110 may engage the inside of the pipe at the open end. Cap 110 may engage both the outside and inside of the pipe at the same time.

FIG. 8D shows a first kind of push connect cap 110A. Cap 110A includes a closed end 116. Cap 110A includes an inner plastic first tube 118 with a distal annular outwardly extending portion. Inner plastic first tube 118 is movable axially in the cap 110A. Inner plastic first tube 118 is tiltable in the cap 110A. Inner plastic first tube 118 engages a first pipe having an outside diameter about equal to the inside diameter of the inner plastic first tube 118. Inner plastic first tube 118 is disposed within and spaced from an inner plastic second tube 120 having annularly arranged metal teeth 122 extending inwardly from second tube 120 for 360 degrees about the second tube 120. Teeth 122 engage or bite into a second pipe that is inserted into cap 110A, which pipe has an outside diameter about equal to the inside diameter of second tube 120. Teeth 122 are resilient and extend from a metal body 124 of the cap 110A. When the second pipe is inserted into cap 110A, the inner ends of teeth 122 are pushed outwardly. Second tube 120 is movable axially in cap 110A. Second tube 120 is tiltable in cap 110A. Metal body 124 is integral and one-piece with metal closed end 116.

FIG. 8E shows a second kind of push connect cap 110B. Cap 110B includes a plastic annular tube 126 that is axially slideable in cap 110B. Plastic annular tube 126 is also tiltable in cap 110B. Plastic annular tube 126 includes slots 128 that extend axially and that are open ended. Immediately inwardly of the plastic annular tube 126 is a set of annularly arranged metal teeth 130 extending from a metal body 132 of cap 110B. The teeth 130 are resilient. Inner ends of the teeth 130 are pushable outwardly by a pipe being engaged by the cap 110B. Cap 110B includes a metal closed end 134 that is integral and one-piece with metal body 132.

FIG. 6 further shows the rubber stoppers 112. Each of the rubber stoppers 112 is frustoconical in shape. That is, each of the rubber stoppers 112 includes a flat outer end 136, a flat inner end 138, and a conical sidewall 140. Each of the rubber stoppers 112 is solid, with no spaces therein, and formed of a resilient material. Such material may be an elastomeric material. Such material may be a rubbery material. The end of a pipe sealed by such rubber stopper 112 terminates somewhere between the outer and inner ends 136, 138, whereupon the pipe is sealingly engaged by the rubber stopper 112.

Each of the rubber stoppers 112 is of a different size. In other words, each of the rubber stoppers 112 includes a mid-point circumference that is half-way between the flat outer end 136 and the flat inner end 138. The mid-point circumference has a mid-point diameter. Each of the mid-point diameters of each of the rubber stoppers 112 is different from each of the other mid-point diameters of the other rubber stoppers 112. Each of the rubber stoppers 112 is intended to sealingly engage an open end of a pipe where such open end is of a different diameter.

FIG. 6 further shows the expansion plugs 114. There are five first expansion plugs 142, two second expansion plugs 144, and three third expansion plugs 146.

First expansion plug 142 includes an L-shaped rubber plug portion 148 bounded by an outer metal disk 150 and an inner metal disk 152. L-shaped rubber plug portion 148 includes an outer disk shaped portion and an inner cylindrical portion, which inner cylindrical portion fits inside of a pipe end. A cam portion 154 is pivotally engaged to an interior shaft that engages the inner metal disk 152. Pivoting the cam portion 154 rotates the cam portion 154 on the outer metal disk 150 away from the upright position shown in FIG. 6 to a crossways position and, at the same time, draws the inner metal disk 152 inwardly, thereby squeezing the rubber plug portion 148 and enlarging the inner cylindrical portion of the rubber plug portion 148. Such pivoting the cam portion 154, such squeezing of the rubber plug portion 148, and such enlarging of the inner cylindrical portion of the rubber plug portion 148 takes place after the rubber plug portion 148 has been inserted into an open pipe end. The step of enlarging seals the pipe against the flow of water. To remove the plug 142 from such open pipe end, the cam portion 154 is rotated from the crossways position back to the upright position shown in FIG. 6, which rotation permits the rubber plug portion 148 to resiliently return to its smaller diameter state (after the broken pipe has been fixed), thereby permitting the removal of the plug 142 from the open end of the pipe (after the pipe has been fixed). It should be noted that the inner metal disk 152 is smaller in diameter than the outer metal disk 150. The inner metal disk 152 is inserted into the open pipe end and the outer metal disk 150 remains outside of the open pipe end.

Expansion plug 144 operates in the same manner as expansion plug 142. Expansion plug 144 includes a ribbed rubber plug portion 156 bounded by an outer metal disk 158 and an inner metal disk 160. A cam portion 162 is pivotally engaged to an interior shaft that engages the inner metal disk 160. Pivoting the cam portion 162 rotates the cam portion 162 on the outer metal disk 158 away from the upright position shown in FIG. 6 to a crossways position and, at the same time, draws the inner metal disk 160 inwardly, thereby squeezing the rubber plug portion 156 and enlarging the cylindrical ribbed portion of the rubber plug portion 156. Such pivoting of the cam portion 162, such squeezing of the rubber plug portion 156, and such enlarging of the cylindrical ribbed portion of the rubber plug portion 156 takes place after the rubber plug portion 156 has been inserted into an open pipe end. The step of enlarging seals the pipe against the flow of water. To remove the second plug 144 from such open pipe end, the cam portion 162 is rotated from the crossways position back to the upright position shown in FIG. 6, which rotation permits the rubber plug portion 156 to resiliently return to its smaller diameter state (after the broken pipe has been fixed), thereby permitting the removal of the second plug 144 from the open end of the pipe (after the broken pipe has been fixed). Each of the circular ribs of the plug portion 156 is coaxial with the inner shaft that engages the cam portion 162 with the inner metal disk 160. It should be noted that the inner metal disk 160 is smaller in diameter than the outer metal disk 158. The inner metal disk 160 is inserted into the open pipe end and the outer metal disk 158 remains outside of the open pipe end.

Third expansion plug 146 operates in the same manner as first and second expansion plugs 142, 144. Expansion plug 146 includes a rubber plug portion 164 bounded by an outer metal disk 166 and an inner metal disk 168. A screwable nut 170 (a cam substitute) is pivotally engaged to an interior shaft 172 that engages the inner metal disk 168. Rotating the screwable nut 170 on the outer metal disk 166 draws the inner metal disk 168 inwardly, thereby squeezing the cylindrical rubber plug portion 164 and enlarging the cylindrical rubber plug portion 164. Such rotating of the screwable nut 170, such squeezing of the cylindrical rubber plug portion 164, and such enlarging of the cylindrical rubber plug portion 164 takes place after the cylindrical rubber plug portion 164 has been inserted into an open pipe end. The step of enlarging seals the pipe against the flow of water. To remove the third plug 146 from such open pipe end, the screwable nut 170 is rotated in the opposite direction, which rotation permits the cylindrical rubber plug portion 164 to resiliently return to its smaller diameter state (after the pipe has been fixed), thereby permitting the removal of the third plug 146 from the open end of the pipe (after the pipe has been fixed). It should be noted that the inner metal disk 168 is smaller in diameter than the outer metal disk 166. The inner metal disk 168 is inserted into the open pipe end and the outer metal disk 168 remains outside of the open pipe end.

First expansion plugs 142 have inner cylindrical plug portions of different diameters to fit pipe open ends of different diameters, such that there are five different diameters for the five inner cylindrical plug portions of the first expansion plugs 142. Second expansion plugs 144 have cylindrical plug portions of different diameters to fit pipe open ends of different diameters, such that there are two different diameters for the ribbed cylindrical plug portions of the two second expansion plugs 144. Third expansion plugs 146 have cylindrical plug portions of different diameters to fit pipe open ends of different diameters, such that there are three different diameters for the cylindrical plug portions of the three third expansion plugs 146.

FIG. 7 shows the second half 96 or second receptacle 96 of the case 92. Second receptacle 96 includes a piece of foam 174 that is engaged, such as by gluing, to the inside faces of the four sidewalls and floor that make the receptacle shape of the receptacle 96. Foam piece 174 includes nine cavities formed therein. Each of the cavities includes an open top and a closed bottom such that there is foam between the closed cavity bottom and the floor of the receptacle 96. The nine cavities are shaped to conform to the following items: 1) a pair of tongue and groove pliers 176, 2) a set of spare hacksaw blades 178, 3) a set of zip ties 88, 4) the hose 20 having a) the tape roll 86, b) zip ties 88 engaged to the inner face of the tape roll 86, c) closure 40, d) handle 70, and e) tether 68, 5) an additional closure 40, 6) a hacksaw 180 having a blade 178, 7) a second relatively large pipe cutter 182, 8) a can 184 of freeze agent, and 9) a foam sleeve 186.

The tongue and groove pliers 176 may be used, for example, to tighten and loosen, the nut portion 170 of cam substitute 170 of the third expansion plug 146. The tongue and groove pliers 176 may also be used to pull away rusted or loose portions of pipes away from the opening to be engaged by the hose proximal end 22. The tongue and groove pliers 176 may be used in the nature of a hammer to flatten sharp protruding pieces of pipe near the pipe opening to be engaged by the hose proximal end 22. The tongue and groove pliers are also known as slip joint pliers. The tongue and groove pliers have first and second jaws. Each of the jaws is serrated or toothed. The first jaw includes a pin. The second jaw includes a groove. The pin slides in the groove to draw the first and second jaws apart to a number of positions where, at any such position, the first and second jaws can pivot relative to each other so as to squeeze an object between the jaws.

The set of zip ties 88 engaged in their respective foam cavity may be used to replenish the zip ties 88 engaged to the inside face of the tape roll 86. A zip tie 88 is a flexible plastic quick connect. A zip tie has a tapered or pointed first end that is pushed through a looped second end, where the looped second end includes a resilient one way locking tab. The resilient one way locking tab engages ridges on the body of the zip tie 88 between the first end and the second end. When the first end is pushed through the second end, the locking tab engages the ridges such that the zip tie may make a smaller and smaller circle or loop as the first end is further pulled or pushed through the second end, so as to tighten and further tighten, for example, the hose proximal end 22 about the vertical pipe portion 12, and so as to automatically hold such tightened circle, loop, or position. Such tightened circle or loop may be released by working a fingernail between the tab and the ridges to bend the tab away from the ridges, whereupon the second end may be drawn out of the first end.

The spare set of hacksaw blades 178 engaged in their own unique foam cavity provide extra hacksaw blades for the hacksaw 180. A hacksaw blade 178 is a piece of hardened metal with relatively fine teeth such that the hacksaw blade can saw through many kinds of metal. The teeth of the hacksaw blade 178 may include high speed steel. The hacksaw blade may be bi-metal. The hacksaw blade 178 may include a strip of high speed steel along the tooth edge that is electron beam welded to a softer spine. The pitch of the teeth of the hacksaw blade 178 can be from about fourteen to about thirty-two teeth per inch (TPI) for a hand blade. The hacksaw teeth of the blade 178 may be set in a wave set. Whereas other types of blades may be set from side to side to provide a kerf or clearance when sawing, the teeth of the hacksaw blade 178 changes gradually from tooth to tooth in a smooth curve, rather than alternate teeth set left and right.

Hose 20 is preferably a firehose. Hose 20 is a high-pressure hose having a working pressure of between about 116 psi and about 800 psi. Hose 20 may include a bursting pressure in excess of about 1600 psi. Hose 20 may be a fabric-covered or synthetic covered flexible hose. Hose 20 may be a rubber-covered, thick-walled flexible hose. Hose 20 may be formed of a rubber or fabric stretchable material such that one or more of the proximal end 22, intermediate portion 28, and distal end portion 30 are stretchable. Hose 20 may be a multiple layer hose of rubber and woven fabric or woven synthetic fabric encapsulating an internal helix of steel wire. Hose 20 may be a flexible hose with a thin polyvinyl chloride cover with a polyvinyl chloride plastic helix. Hose 20 may have an inside diameter from about 0.75 inches to about 6.0 inches. Hose 20 may have a length from about 25 feet to about 200 feet or more for use in residential buildings or structures. Hose 20 may have a length from about 25 feet to about 1000 feet or more for use in commercial buildings or structures. The length of the hose 20 is measured from the start of the proximal end portion 22 to the end of the distal end portion 30.

FIG. 8C shows a diagrammatic view of the hose 20 as the hose 20 is found in the rolled up state in receptacle 96 of the case 92. The hose 20 includes an endless inside face 188 where, in the rolled up state, about one-half of the endless face 188 abuts the other half of the endless inside face such that the piece takes a flat form albeit a tubular form that can fill with and convey water.

Closure 40 is engaged in its own unique foam cavity. The closure 40 is shown in FIGS. 7, 8A and 8B. Closure 40 includes a first body 190 and a second body 192. Bodies 190, 192 are engaged by a hinge 194. Body 190 includes an end tab 196 having a face 198. The face 198 of end tab 196 engages the cross member 200 of a U-shaped end 202 to engage the bodies 190, 192 together. Body 190 includes first and second longitudinally extending channels 204. Body 192 includes first and second longitudinally extending ribs 206. First channel 204 receives first rib 206 therein and second channel 204 receives second rib 206 therein to thereby pinch a section of the hose 20 therein and minimize water flow therethrough. The engagement between the tab 196 and U-shaped end 202 is intentionally made relatively weak such that when a water of a predefined pressure builds up in the intermediate hose portion 28, i.e., upstream from the closure 40, tab 196 disengages from the U-shaped end 202 such that the bodies 192, 194 swing apart to permit water to be conveyed through the distal end portion 30 and out of the open end 42.

The hacksaw 180 includes one hacksaw blade 178. The hacksaw blade 178 is engaged to a handle portion 208 of the hacksaw 180 and is further engaged to the far end 210 of a U-shaped body portion 210 of the hacksaw 180. The U-shaped body portion 210 is integral with the handle portion 208.

The relatively large second pipe cutter 182 includes a finger or hand wheel 216 that pushes in and draws back a circular cutting blade 218. Blade 218 is pushed toward and away from a set of metal freely turning wheels 220 that are set in the far end 222 of a U-shaped body portion 224. U-shaped body portion 224 is integral with a handle 226. Hand wheel 216 and circular cutting blade 218 are engaged with handle 226. The pipe to be cut is engaged between blade 216 and freely turning wheels 220. Relatively large second pipe cutter 182 cuts pipe having outside diameters of between about 5 and about 50 mm. Relatively small second pipe cutter 192 cuts pipe having outside diameters of between about 1 mm and about 15 mm. In each of the pipe cutters 182 and 95, the axis of the respective rotating blade 218, 97 travels to and from wheels 202, 103 in a straight line.

Can 184 contains a pipe sprayable freeze agent. One pipe freeze agent is 1, 3, 3, 3-Tetrafluoropropene. The freeze agent cools the pipe, usually metal, to a temperature below 32 degrees Fahrenheit, which then freezes water in the pipe. Sleeve 186 is positioned about the portion of the pipe that is intended to be treated with the seam 228 in upward position such that the freeze agent does not run out initially under the influence of gravity. Sleeve 186 is cylindrical and seam 228 extends radially outwardly from a central cylindrically shaped open space 230. Seam 228 permits the foam sleeve 186 to be opened to be positioned co-axially with the pipe to be treated. The freeze agent is then sprayed into one of the open ends of the open space 230 or through a section of the seam 228. If desired, a plastic cylindrical jacket can be wrapped about the foam sleeve 186 prior to the freeze agent being sprayed into one of the open ends 230. The freeze agent and sleeve 228 may be used to minimize flooding from a broken pipe in combination with one or more push connectors caps 110, one or more rubber stoppers 112, and/or one or more expansion plugs 114, any of which may be used by itself or in combination with the proximal end portion 22 of the hose 20. The freeze agent should be used in accordance with the manufacturer's recommendations. For example, it may be proper to lower water pressure by closing a valve to increase the likelihood of an ice blockage forming.

In other words, the hose 20 having the proximal end portion 22 may be used to minimize flooding from a broken pipe by itself or in combination with one or more of a) one or more of the push connectors caps 110, b) one or more of the rubber stoppers 112, c) one or more of the expansion plugs 114, and/or d) freeze agent and sleeve 228.

A push connector cap 110 may be used to minimize flooding from a broken pipe by itself or in combination with one or more of a) one or more of the push connectors caps 110, b) one or more of the rubber stoppers 112, c) one or more of the expansion plugs 114, d) freeze agent and sleeve 228, and/or e) the hose 20 having the proximal end portion 22.

A rubber stopper 112 may be used to minimize flooding from a broken pipe by itself or in combination with one or more of a) one or more of the push connectors caps 110, b) one or more of the rubber stoppers 112, c) one or more of the expansion plugs 114, d) freeze agent and sleeve 228, and/or e) the hose 20 having the proximal end portion 22.

An expansion plug 114 may be used to minimize flooding from a broken pipe by itself or in combination with a) one or more of the push connectors caps 110, b) one or more of the rubber stoppers 112, c) one or more of the expansion plugs 114, d) freeze agent and sleeve 228, and/or e) the hose 20 having the proximal end portion 22.

It should be noted that a broken pipe may have multiple broken openings.

It should be noted that various items set in the foam 108, 174 in their own unique cavities in receptacle 94 or 96 may be further engaged therein by L-shaped members 232 where one portion of the L-shaped member 232 extends over a portion of the item and where the other portion of the L-shaped member 232 extends into the foam 108 or 174 and is engaged therein or is engaged to the respective floor of the receptacle 94, 96.

Due to safety concerns, only professionals should attempt to install push connect caps, frustoconical stoppers, and expansion plugs. Further, such should not be attempted if water pressure creates a potential for bodily harm.

A common issue relates to a reciprocating saw that may be used to cut away sheet rock such that the user of the reciprocating saw cannot see the horizontal or vertical or oblique water line behind the sheet rock. The user may nick a pipe, create an opening such as opening 234 shown in FIG. 4A, feel, see, and/or hear the contact between the reciprocating saw and pipe, feel, see, and/or hear the spray of water, and realize that there may be an issue. Then the user may remove the sheet rock and use one or more features of the present invention, including the hose 20 and its proximal end 22, one or more of the pipe cutters 95, 182, and one or more of tools in the case 92, such as the push connect caps 110, rubber stoppers 112, or expansion plugs 114. To funnel the water leakage from opening 234 into the hose 20, the proximal end 22 may be manipulated or engaged to piping 12 as shown in FIGS. 4B and 4C or the proximal end 22 may be manipulated or engaged to piping 12 as shown in FIGS. 3A, 3B, and 3C.

It should be noted that the junction between the proximal end 22 and the intermediate portion 28 may be referred to as a mouth. The proximal end 22 may be referred to as a tongue 22, where the tongue 22 has a width greater than the diameter or width of the intermediate portion 28. The tongue 22 may wrap around structure in various ways to direct fluid leaks in the structure to the mouth and intermediate portion 28. In other words, the tongue 22 extends from the mouth, then wraps about such a structure, then extends back to the mouth and into the mouth, and then into the intermediate portion 28.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A water containment apparatus for engaging a broken pipe portion, comprising:
   a piece having a proximal end portion, a distal end portion, and an intermediate portion between the proximal end portion and the distal end portion, each of the proximal end portion, intermediate portion, and distal end portion of the piece being flexible;
      wherein the intermediate portion of the piece is tubular and includes an intermediate portion axis;
      wherein the distal end portion of the piece is tubular and includes an open end;
      wherein the proximal end portion of the piece is a flap extending from the intermediate portion to a far end movable away from the intermediate portion; and
   a tether having a proximal end and a distal end, the proximal end of the tether engaging the far end of the proximal end portion, the tether extending from the far end of the proximal end portion to an inside of the intermediate portion, through the intermediate portion, to an outside of the intermediate portion, the distal end of the tether being outside of the intermediate portion:
   wherein the proximal end portion of the piece is configurable into a first state where the proximal end portion of the piece is non-tubular and lengthwise edges of the proximal end portion are spread apart;
   wherein the proximal end portion of the piece is configurable into a second state where the proximal end portion of the piece is folded away from the intermediate portion to permit the intermediate portion to engage the broken pipe portion when inserted into the intermediate portion such that an axis of the broken pipe portion extends generally in a direction of the intermediate portion axis; and
   wherein the proximal end portion of the piece is configurable into a third state where the far end of the proximal end portion is positioned within the inside of the intermediate portion, the proximal end portion thereby forming a tubular structure having a third state axis that extends generally transverse to the direction of the intermediate portion axis to permit the proximal end portion to engage the broken pipe portion by wrapping the proximal end portion about the broken pipe portion such that the axis of the broken pipe portion extends generally traverse to the direction of the intermediate portion axis.

2. The water containment apparatus of claim 1, wherein the proximal end portion of the piece is integral with the intermediate portion of the piece, and wherein the intermediate portion of the piece is integral with the distal end portion of the piece.

3. The water containment apparatus of claim 1, wherein the proximal end portion is formed by cutting an initially tubular material lengthwise along one side.

4. The water containment apparatus of claim 1, wherein the proximal end of the tether includes a quick connect.

5. The water containment apparatus of claim 1, wherein the distal end of the tether includes a handle.

6. The water containment apparatus of claim 1, and further including a roll of tape engaged to or on the intermediate portion of the piece.

7. The water containment apparatus of claim 6, and further including a zip tie removably engaged to the roll of tape.

8. The water containment apparatus of claim 1, wherein the piece is configured such that an inside of the tubular structure formed by the proximal end portion in the third state communicates with the inside of the intermediate portion to enable fluid leaking from the broken pipe portion wrapped by the proximal end portion to flow into the inside of the intermediate portion.

9. The water containment apparatus of claim 1, wherein the distal end portion of the piece includes a releasable closure configured to pinch shut said open end while water pressure inside the piece remains below a release pressure, and configured to automatically disengage from the piece to release the open end when water pressure inside the piece exceeds the release pressure.

10. The water containment apparatus of claim 1, wherein the piece is configurable into a rolled up state wherein the intermediate portion of the piece is configured into a flat tubular state, the distal end portion of the piece is disposed in a central portion of the piece in the rolled up state, and the proximal end portion of the piece is disposed on a periphery of the piece in the rolled up state.

11. The water containment apparatus of claim 10, wherein the intermediate portion of the piece includes a circumferentially continuous inside face wherein, when the intermediate portion is in the flat tubular state, about one-half of the inside face abuts the other half of the inside face.

12. The water containment apparatus of claim 10, and further including a container having an outside and an inside and a handle engaged to the outside of the container for carrying the container, the inside of the container configured to receive the piece in the rolled up state.

13. The water containment apparatus of claim 12, and further including a set of push connect caps for engaging a pipe to stop a flow of water, a set of frustoconical stoppers for engaging a pipe to stop a flow of water, and a set of expansion plugs for engaging a pipe to stop a flow of water; wherein the inside of the container is configured to receive the set of push connect caps, the set of frustoconical stoppers, and the set of expansion plugs.

14. The water containment apparatus of claim 12, and further including a) a hacksaw having a hacksaw blade and b) a manual pipe cutter; wherein the inside of the container is configured to receive the hacksaw having the hacksaw blade and the manual pipe cutter.

15. The water containment apparatus of claim 12, and further including a freeze agent and foam sleeve; wherein the inside of the container is configured to receive the freeze agent and the foam sleeve.

16. The water containment apparatus of claim 12, and further including a pair of pliers; wherein the inside of the container is configured to receive the pair of pliers.

17. A water containment apparatus, comprising:
a piece having a proximal end portion, a distal end portion, and an intermediate portion between the proximal end portion and the distal end portion, each of the proximal end portion, intermediate portion, and distal end portion of the piece being flexible;
wherein the proximal end portion of the piece is a flap extending from the intermediate portion to a far end movable away from the intermediate portion;
wherein the intermediate portion of the piece is tubular and includes an intermediate portion axis;
wherein the distal end portion of the piece is tubular and includes an open end;
wherein the proximal end portion of the piece is integral with the intermediate portion of the piece, and wherein the intermediate portion of the piece is integral with the distal end portion of the piece; and
a tether having a proximal end and a distal end, the proximal end of the tether engaging the far end of the proximal end portion, the tether extending from the far end to an inside of the intermediate portion, through the intermediate portion, to an outside of the intermediate portion, the distal end of the tether being outside of the intermediate portion;
wherein the water containment apparatus is configured such that pulling on the distal portion of the tether draws the far end of the proximal end portion into the inside of the intermediate portion such that the proximal end portion forms a tubular structure having an axis transverse to the intermediate portion axis, said tubular structure in communication with the inside of the intermediate portion to permit a fluid within the proximal end portion to flow into the inside of the intermediate portion.

18. The water containment apparatus of claim 17, wherein the intermediate portion and distal end portion comprise hose.

19. The water containment apparatus of 17, wherein the intermediate portion and distal end portion comprise high pressure hose having a burst pressure of at least 1600 psi.

20. The water containment apparatus of claim 17, wherein the proximal end portion is formed from hose cut lengthwise along one side.

* * * * *